Nov. 13, 1962 F. A. STRAUB ETAL 3,063,133
METHOD OF MAKING LOW FRICTION GREASELESS BEARINGS
Filed March 18, 1960

FREDERICK A. STRAUB
EDWARD SAHAGIAN
KARL R. M. KARLSTROM
INVENTORS.

BY *Miketta and Jenny*

ATTORNEYS.

United States Patent Office 3,063,133
Patented Nov. 13, 1962

3,063,133
METHOD OF MAKING LOW FRICTION
GREASELESS BEARINGS
Frederick A. Straub and Edward Sahagian, Los Angeles, and Karl R. M. Karlstrom, Burbank, Calif., assignors, by mesne assignments, to Kahr Bearing Corporation, Burbank, Calif., a corporation of California
Filed Mar. 18, 1960, Ser. No. 16,023
8 Claims. (Cl. 29—149.5)

This invention relates to a method of making greaseless, low friction, high load, spherical bearings in which an outer, metallic bearing race member is formed about an inner ball-shaped bearing member. More particularly, the invention relates to an economical method of providing greaseless, spherical bearings having the ability to effectively support a higher loading (under dynamic load applications) than spherical bearings of the steel-on-steel type.

Spherical bearings have been manufactured heretofore for many years (see Fiegel No. 1,693,748, for example). In most of the spherical bearings made heretofore, the inner ball member was restrained within an outer race member and both the ball and the outer race member were made of a suitable metal, such as, for example, steel. When the outer race member is press-formed around the ball, certain disadvantageous results are obtained; in some instances the inner surface of the race member is wrinkled so that an uneven surface is presented to the ball member. In other instances the inherent spring-back of the metal which constitutes the outer race member causes the edge areas of the race member to spring away from the ball after the forming pressure is relieved, thereby generating an excessive spacing or clearance between the ball and marginal edge portions on the inner surface of the race member while concurrently the median portion of the race member is in binding engagement with the outer surface of the ball, thereby requiring some form of liberation to take place in order to generate a proper amount of clearance in such median area; when such liberation is restored to the excessive clearance in the marginal portions becomes even greater.

These prior metal-to-metal spherical bearings require a constant supply of lubricant in order to reduce the friction betwen the surfaces. In order to reduce the problems generated by the necessity of constantly supplying a lubricant to the ball member, some prior workers have preformed inserts and placed such inserts between the ball and the outer race member. For example, Patent No. 2,461,626, issued February 15, 1949, employs canvas impregnated with oil or with a synthetic resin or plastic, while Patent No. 2,885,248, issued May 5, 1959, preforms a laminated insert of low-friction material about the inner member and then assembles such inner member, preformed inserts and an outer member for a further application of pressure and heat in order to set and cure the insert within the assembly. Such method requires a separate step of preforming the insert as well as expensive equipment adapted to apply heat and pressure at the same time to the assembly.

The use of such preformed inserts has been found to be uneconomical and not satisfactory in actual practice in view of the fact that such inserts have a tendency to drop out under vibration and in actual use.

The present invention is based upon the discovery that, by the use of proper manipulative methods, it is possible to obtain a spherical bearing which is greatly superior to prior spherical bearings. The bearings of the present invention, for example, are capable of effectively supporting much higher loads, under dynamic load applications, than spherical bearings of the steel-on-steel type. Moreover, the method of the present invention provides a substantially uniform, constant, contact surface between the race and the ball. It is to be understood that the bearings of the present invention are used under many conditions; they compensate for misalignment of shafts, they permit the ball to rotate and to operate, in some instances high rotational speeds have to be carried by the ball while in others, the ball is subject both to axial and radial forces and must oscillate. In a great many applications it is virtually impossible to supply lubricant to the spherical bearings and the present invention eliminates the necessity of constantly supplying lubricant to the ball. Servo-mechanisms employing spherical bearings of the present invention may be used in missiles and aircraft wherein the bearings are subjected to enormous changes in ambient temperatures; the bearing of the present invention operates effectively under low temperatures and high temperatures. Furthermore, the method of the present invention does not require hammering or loosening operations (as in Patents No. 2,476,728 and 2,626,841) subsequent to press-forming and prior to installation of the bearing in its place of use.

According to the invention, the method (preferably consists of expanding an inner ball member (within its elestic limit) by inserting an expansion pin within a bore through the ball. The expanded ball member is then assembled within an outer race member have a very thin compliant sheet of low friction material such as a "Teflon" fabric, adjacent its inner surface. The back of the sheet of low friction material adjoining the inner surface of the race member is provided with a thermosetting adhesive material. The outer race member is then press-formed about the expanded inner ball member with the thin sheet of low friction material between them. After forming the race about the ball, the forming pressure is relieved and the assembled ball and race are subjected to a baking operation to bond the thermosetting adhesive backing of the friction material to the outer race member in the absence of such forming pressure. Thereafter, the expansion pin is removed from the ball (which now returns to its original diameter), resulting in a spherical bearing which can be rotated in its race by finger pressure. The thin layer of compliant, low friction material irremovably bonded to the inner surface of the outer race appears to be in complete contact with the ball, so that no measurable clearance exists between the ball and its race, but the ball is rotatable. The bearing does not exhibit axial or radial free play.

It is an object of the present invention, therefore, to disclose and provide a simple and effective method of making operable, greaseless, low friction, spherical bearings.

It is another object of the invention to disclose and provide a method of making spherical bearings which are capable of carrying much higher loadings under dynamic load applications than spherical bearings of the steel-on-steel type, the method utilizing peculiar characteristics and reactions of the materials employed in attaining the desired objective.

A still further object of the invention is to disclose and provide a method which permits the manufacture of spherical bearings of greater efficiency without the necessity of using complicated machinery or controls.

Further objects and advantages of the invention will be apparent to those skilled in the art and the method of the invention will be more completely disclosed by a consideration of the following detailed description in which reference will be made to the appended sheet of drawings in which.

Figure 1:
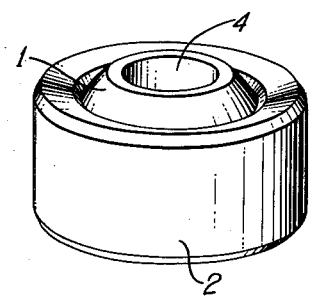
FIG. 1 is a perspective view of a greaseless low friction spherical bearing made according to the invention.
Figure 2:
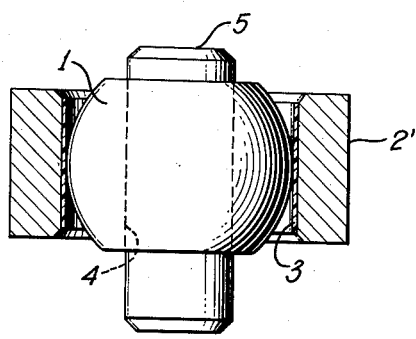
FIG. 2 is a partial cross-sectional view of an assembly from which the bearing of FIG. 1 may be made, the view being along a vertical medial plane and prior to a forming operation.
Figure 3:
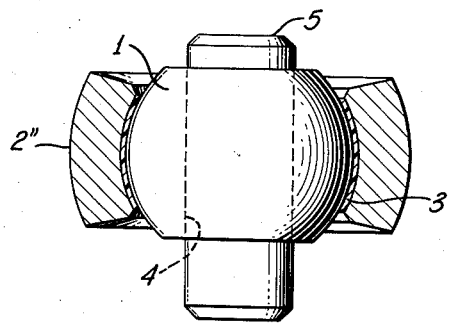
FIG. 3 is a partial cross-sectional view of the bearing assembly along a vertical medial plane after a forming operation.
Figure 4:
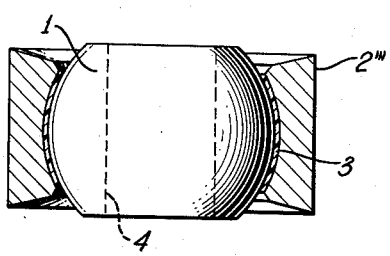
FIG. 4 is a partial cross-sectional view of the bearing of FIG. 3 after a rough machining operation but before the final finish machining operation to provide the finished bearing of FIG. 1.

An exemplary embodiment of a high load, low friction greaseless spherical bearing, made according to the method of the invention, is shown in FIG. 1. The bearing is comprised of a rotatable ball member 1, a race ring 2, and a thin sheet of low friction material 3 which is positioned between the ball 1 and race 2 and against which ball 1 bears, as seen in FIGS. 2, 3 and 4.

Ball member 1 is preferably made of a hardened metal and is initially completely cleaned of any grease or oil which may have been employed as a protective coating against deterioration such as that normally due to oxidation or rusting. A bore 4 is provided through the ball member 1 to facilitate the use of the bearing assembly with a shaft or rod which may be positioned therein. Bore 4 is employed during the making of the bearing to provide a temporary expansion of the ball member 1; an expansion pin 5 is force-fitted into bore 4 therein, causing an expansion of ball 1 within its elastic limit. Such expansion of ball member 1 is maintained during a subsequent operation in which race member 2 is formed about the ball member 1. Ultimately, when the pin 5 is removed, the ball 1 regains its original diameter. Before or after pin 5 is inserted into the ball member 1, but before the forming operation, a thin mold wash of parting compound (such as a silicone or wax emulsion) is applied to ball 1 and pin 5 to aid in facilitating movement of ball 1 in race 2 after the forming operation. Such parting compound is preferably applied in the form of a mist before the ball 1 and pin 5 are assembled within the race 2, and the resulting film is of almost imperceptible thickness and may be discontinuous.

Race 2 is preferably made of a blank of generally tubular shape and is usually of an unhardened malleable metal of lower hardness than the ball, such as stainless steel, so that it may be formed about the ball member 1 by the application of pressure thereon by the use of suitable forming dies. Dies of the type shown in my copending application Serial No. 807,686, filed April 20, 1959, may be used. Race 2 is initially in the form of the race blank 2', shown in FIG. 2, with its inner surface of slightly greater diameter than that of the ball, such surface being rough machined or sand blasted to provide a surface suitable for receiving and retaining the low friction material 3.

A thin sheet of low friction woven fabric material 3 having an adhesive backing of thermosetting material is placed within the blank 2' all the way about the inner surface of race 2' before the ball member 1 is assembled within race 2'. Such low friction material 3 is preferably provided in a very thin compliant sheet form which may be readily cut to size to fit within the blank 2' as desired. The thickness of the low friction material is generally about 0.020 or 0.030 inch; it is shown in FIGS. 2, 3 and 4 with an enlarged cross section. When cutting such fabric to size, the cuts are preferably made on the bias so that the abutting ends of the fabric 3, when positioned within the race blank 2', will form a line of contact which is at an angle to the axis of the race blank 2'. This prevents the application of load on fabric 3 at any one moment to fall entirely on such connecting area and facilitates smooth operation of the bearing. Fabric 3 may be made with a cotton base and a surface weave of Teflon yarn similar to fabric described in Patent No. 2,908,506 and is provided with a back coating of adhesive which is thermosetting, such as a phenolic thermosetting resin. Teflon, as used herein, refers to substances which exhibit an extremely low coefficient of friction and do not adhere to other substances and which are generally forms of fluoroethylene such as tetrafluoroethylene and other similar polymers. The low friction material 3 is positioned within race blank 2' with the backing of thermosetting material adjacent the roughened inner wall of the race blank 2' and the Teflon or low friction material surface facing inwardly to bear against the ball member 1 when it is assembled therein.

After the low friction material 3 is positioned within the race blank 2', the expanded ball member 1 is inserted into the race 2' as shown in FIG. 2. The inner diameter of race 2' including the sheet of low friction material 3 may be predetermined to provide a frictional fit between the expanded ball 1 and the race 2' so that parts need not be held together by additional mechanical means when so assembled. The race 2' is then press-formed or swedged about the ball 1 by the application of inwardly directed pressure thereon by a forming press employing suitable forming dies. Race blank 2' is thereby swedged into the formed race 2" as shown in FIG. 3.

After forming race blank 2' into the formed race blank 2", of FIG. 3, the forming pressure is relieved, the assembly 20 removed from the press, and the assembly is subjected to a baking process. The application of heat in the absence of the forming pressure is employed to cause the thermosetting adhesive backing on the fabric 3 to become tenaciously bonded to the roughened or matt inner surface of the race around 2". The baking process should be conducted at a temperature insufficient to cause liquefaction of the Teflon. A heating process of about thirty minutes duration and at a temperature of about 360° to 375° F. has been used successfully.

After baking the assembled expanded ball 1, race 2" and fabric 3, the expansion pin 5 is removed and the ball 1 allowed to recover or shrink elastically to its normal size. Prior to the removal of pin 5, the ball 1 and race 2" are normally tightly bound together due to the effects of the forming operation. The removal of the expansion pin 5 after such forming operation generally allows the ball 1 to contract enough to provide a bearing in which the ball 1 can be rotated within the race 2" by the application of finger pressure (equivalent to about 3 to 5 inch pounds). No additional loosening operations such as hammering or pounding of the race 2" are required to obtain such desired bearing.

After the operations described hereinabove, the outer surface of the race 2" is generally machined to cylindrical form. This rough machine state of the bearing with the pin 5 removed is shown in FIG. 4. While in this condition, in some instances and with some metals, it may be desirable to subject the bearing to a secondary, minor, repressing operation, although in most instances this secondary repressing is not required. Thereafter, the upper and lower end faces of the race may be machined so as to place the bearing in its finished form illustrated in FIG. 1.

Attention is drawn to the fact that the method of the present invention produces bearings which are substantially free from play. In actual practice it has been found that the bearings do not have any measurable play, that is, the ball will not move either radially or axially within the formed race under applied pressure, but will be free to rotate therein. It is not possible to insert thickness gauges between the surface of the ball and the race. These freely rotatable, slightly preloaded, spherical bearings are eminently suited for applications where considerable load has to be carried under dynamic conditions of rotation, oscillation, misalignment, etc. More accurate operating linkages and servo-mechanisms are thus made available by the use of the bearings of this invention, since, as previously indicated, there is no backlash or free play involved.

Attention is also called to the fact that the equipment and steps employed in the manufacture of the bearing of the present invention are not expensive, complicated, nor troublesome. What is normally referred to as "bearing contact" between a ball and a race therearound amounts to substantially 100% of the inner surface of the race ring. Normally this bearing or contact area is determined by applying a dye to a ball that has been shifted so that its axis is transverse to the axis of the race and then rotating the ball back into its normal position (with the ball axis parallel to the axis of the race) and rotating the ball. Subsequently an examination is made of the inner surface of the race to determine where the dye has been deposited upon the surface of the race. Bearings of the instant invention show that this sliding contact is obtained over the entire inner surface of the race ring, thereby justifying the statement that the bearings provide a 100% contact area.

All changes coming within the scope of the appended claims are embraced thereby.

We claim:

1. The method of forming a low friction greaseless bearing which includes the steps of: inserting an expansion pin into the bore of a ball member to expand it within its elastic limit; placing a thin and compliant sheet of Teflon fabric having an adhesive backing of a phenolic thermosetting resin within a tubular race blank with the adhesive backing against an inner wall of the race blank; placing the expanded ball within the tubular race blank with the Teflon fabric between the ball and the inner wall of the race blank and applying forming pressure to the race blank to form it about the ball and produce an assembly wherein the ball is tightly held by the formed race; relieving such forming pressure and applying heat to the assembly to cause the adhesive backing of the Teflon fabric to become bonded to the inner wall of the race; and removing the expansion pin from said ball to relieve said tight fit between said ball and said race.

2. The method of claim 1 wherein a parting compound is applied to the outer surface of the ball member prior to the formation of the race therearound.

3. The method of claim 1 wherein the heat applied to the assembly is insufficient to cause liquefaction of the Teflon.

4. The method of forming a low friction greaseless bearing including the steps of: placing a thin compliant strip of woven and resilient low friction material provided with an adhesive thermosetting backing on the inner wall of a metal race blank; inserting an expansion pin into the bore of a ball to expand the ball within its elastic limit; placing the ball within the race blank with the low friction material between the ball and race and applying pressure to the race to form it about the ball; discontinuing such forming pressure and applying heat to the assembled ball, race and low friction material to cause the thermosetting adhesive backing on said low friction material to become bonded to the inner wall of the race; and removing the expansion pin from the ball.

5. The method of forming a low friction greaseless bearing including the steps of: inserting a thin sheet of low friction material having a thermosetting adhesive backing into an outer bearing member with the adhesive backing against the inner wall of said outer member; assembling an inner bearing member within the outer member with the low friction material between said inner and outer member, said inner and outer members being at about normal room temperature, and applying pressure to said outer member to form it about said inner member; relieving such forming pressure and thereafter applying heat to the assembled inner member, outer member and low friction material to cause the thermosetting adhesive backing on said low friction material to become bonded to the inner wall of said outer member.

6. The method of forming a low-friction, greaseless, slightly preloaded, self-aligning spherical bearing free from backlash and axial and radial play consisting of: placing a strip of fabric having a thickness on the order of between about 0.020 and 0.040 inch on the inner wall of a tubular race blank; said wall having a matt finish and a diameter slightly greater than the diameter of a ball provided with an axial bore; said fabric having an inner surface composed essentially of tetrafluroethylene and an outer surface carrying a thermosetting adhesive resin; force fitting an expansion pin into the bore of a ball to expand the same within its elastic limit; placing the ball with its expansion pin within the race blank; applying forming pressure to the race blank to conform the blank and fabric to the surface of the ball; relieving the forming pressure and placing the ball, race and pin assembly in a heating zone; subjecting said assembly to heat to soften and cure the thermosetting adhesive and then removing the pin from the ball to obtain a spherical bearing in which the ball is rotatable upon the application of finger pressure and in which the ball exhibits no radial or axial free play.

7. The method of forming a low friction greaseless bearing having a metallic outer race member formed about a generally spherical inner ball member with a thin sheet of low friction material disposed therebetween comprising the steps of: inserting a thin sheet of low friction material having a thermosetting adhesive backing into an outer race member with the adhesive backing disposed adjacent an inner wall of said outer race member; assembling a generally spherical inner ball member within the outer race member with said low friction material disposed between said ball and race members, said ball and race members being at about normal room temperature; applying pressure to said outer race member to form said race member about said generally spherical inner ball member; relieving said pressure and thereafter applying heat to the assembled ball member, race member and low friction material to bond said thermosetting adhesive back to said inner wall of said outer member in the absence of the application of said forming pressure.

8. The method of claim 7 wherein said low friction material is provided with front surface composed in part of fibers of tetrafluoroethylene and has a sheet thickness of between about 0.020 and 0.040 inch.

References Cited in the file of this patent

UNITED STATES PATENTS

| | | |
|---|---|---|
| 1,693,748 | Fiegel | Dec. 4, 1928 |
| 2,835,521 | White | May 20, 1958 |
| 2,885,248 | White | May 5, 1959 |
| 2,904,874 | Norton | Sept. 22, 1959 |
| 2,932,081 | Witte | Apr. 12, 1960 |
| 2,958,927 | Kravats | Nov. 8, 1960 |